United States Patent [19]

Hite et al.

[11] Patent Number: 4,558,492

[45] Date of Patent: Dec. 17, 1985

[54] BELT FASTENER

[76] Inventors: John B. Hite, 3106 Frozen Dog Rd.;
Matthew R. Reynolds, 2732 Cherry
Cir., both of Emmett, Id. 83617

[21] Appl. No.: 605,331

[22] Filed: Apr. 30, 1984

[51] Int. Cl.⁴ .............................................. F16G 3/08
[52] U.S. Cl. ..................................... 24/37; 24/31 R;
24/31 B; 198/847; 474/257
[58] Field of Search ............ 24/37, 31.R, 31 B, 31 L,
24/31 H, 31 F, 31 C; 198/847, 846; 474/207,
228, 230, 257

[56] References Cited

U.S. PATENT DOCUMENTS

| 699,538 | 5/1902 | Larava | 24/31 B |
| 752,512 | 2/1904 | Buckley | 474/257 |
| 754,567 | 3/1904 | Jackson | 24/37 |
| 1,134,139 | 4/1915 | Kennedy | 24/31 B |
| 1,267,325 | 5/1918 | Krzyworzycki | 24/31 B |
| 1,382,799 | 6/1921 | Purple | 24/37 |
| 1,659,001 | 2/1928 | Purple | 24/37 |
| 3,093,005 | 6/1963 | Dean | 24/31 B |
| 3,141,346 | 7/1964 | Dean | 24/37 |
| 3,212,147 | 10/1965 | Lambert | 24/37 |
| 3,638,281 | 2/1972 | Francois | 24/31 B |
| 4,161,059 | 7/1979 | Francois | 24/31 H |

FOREIGN PATENT DOCUMENTS

| 3235689 | 3/1984 | Fed. Rep. of Germany | 198/847 |
| 1040301 | 8/1966 | United Kingdom | 24/31 B |
| 1261681 | 1/1972 | United Kingdom | 474/257 |

Primary Examiner—Victor N. Sakran
Attorney, Agent, or Firm—Paul F. Horton

[57] ABSTRACT

A belt fastener of non-metallic composition for use, in particular, with conveyor belts used in conjunction with metal detectors, the belt fastener including one or more top plates having bolt receiving apertures; one or more bottom plates with bolt receiving apertures in registry with the bolt receiving apertures of the top plates and bolts adapted for insertion through said apertures and through openings of a belt located between the plates to hold the fastener in place to fasten two ends of a flexible belt together. Annular flanges, about the periphery of the bolt receiving apertures, downwardly depending from the top plates and upwardly extending from the bottom plates, prevent contact between the belt and bolts while providing lateral support for the bolts. The plates and bolts are preferably manufactured of ultra high molecular weight polyethylene.

5 Claims, 5 Drawing Figures

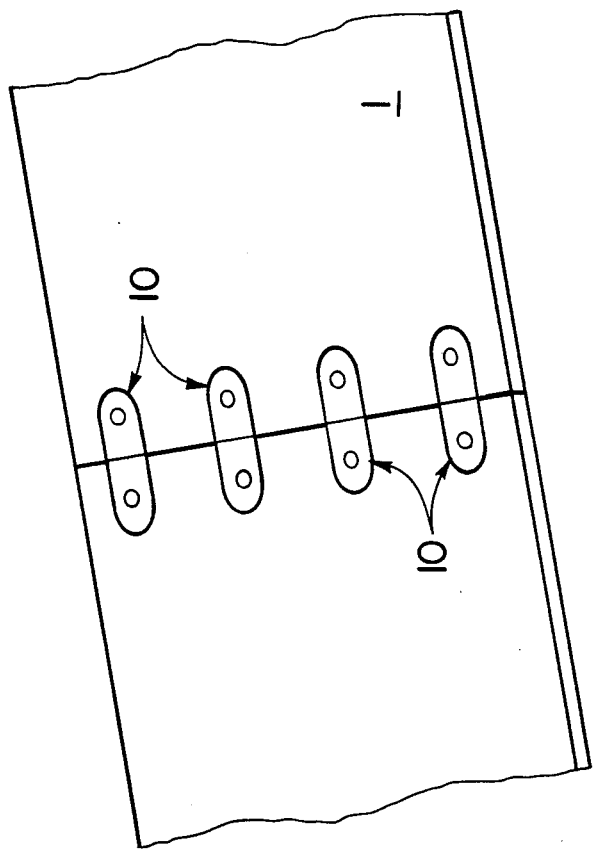

BELT FASTENER

BACKGROUND OF THE INVENTION

1. Field of the Invention

This invention relates, in general, to belt fasteners used to connect the ends of a flexible belt and, more particularly belt fasteners used on conveyer belts operated in conjunction with metal detectors.

2. Description of the Prior Art

Belt fasteners, as typified by U.S. Pat. Nos. 699,538 issued to H. F. Larava; U.S. Pat. No. 1,134,139 issued to P. Kennedy; U.S. Pat. No. 3,093,005 issued to V. B. Dean; and British Pat. No. 1,040,301 issued to I. E. Jackson, are well known in the art for connecting ends of conventional drive and conveyor belts. Such fasteners in the past have been constructed of metal such as steel or brass and most often made of spring steel. Often conveyor belts are used in association with metal detectors and the ability to detect unwanted metal carried on the conveyors is of utmost importance where material carried is to engage cutting blades, such as is common in the wood processing industry. Conventional fasteners are obviously unsuitable for use on such conveyor belts and therefore the ends of the flexible belts are connected by vulcanization. The vulcanization process is suitable for the production of new belts but is impractical for use on broken belts where new belt sections must be added for proper belt length and therefore a break in a belt results in the discarding of the belt at great cost and inefficiency.

SUMMARY OF THE INVENTION

The present invention overcomes this problem by providing belt fasteners constructed of flexible non-metallic material. Where substances other than metal are used, it is important that such fasteners be sufficiently flexible to bend with the belt in the belt's contact with supporting drive or idler rollers. It is important that the material be abrasion resistant in its contact with supporting plates and rollers as well as its contact with material being carried by the belt and to be substantially chemically inert to materials with which it might come in contact.

Briefly stated, the present invention includes one or more flexible non-metallic top plates provided with bolt receiving apertures; one or more flexible non-metallic bottom plates with bolt receiving apertures in registry with the apertures of the top plates; and non-metallic bolts connecting the plates to fasten belt ends placed therebetween. To prevent excessive wear on the belts; to provide lateral support for the bolts; and to prevent accidental unloosening of the bolts from the plates, each top plate includes a downwardly depending annular flange about each aperture and each bottom plate includes an upwardly extending annular flange adapted for insertion into a respective flange of the top plate. Hinges may be provided where greater flexibility is required. A more thorough description of the invention may be found in the appended claims.

It is therefore a primary object of the present invention to provide belt fasteners constructed of non-metallic material for use on conveyor belts used in conjunction with metal detectors.

It is also an important object of the present invention to provide belt fasteners which are flexible, abrasion resistant, chemically inert to contacting materials, non-toxic for use in food handling applications, and which prevent frictional sparking for use in areas where volatile explosive materials may be present.

An additional object of the present invention is to provide belt fasteners which are readily attchable by hand on conveyors used in conjunction with metal detectors and which require no vulcanization or glue and which greatly extend the belt life.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 3 is a perspective view of belt ends fastened by the fasteners shown in FIGS. 1 and 2.

DETAILED DESCRIPTION OF THE INVENTION

Figure 2:
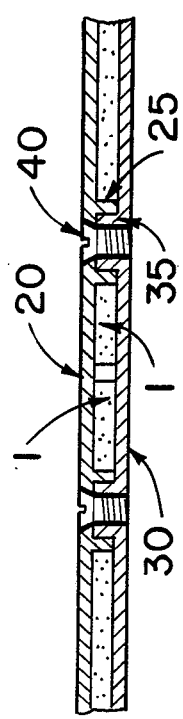
FIG. 2 is a sectional side elevation of conveyor belt ends connected by the belt fastener shown in FIG. 1.
Figure 1:
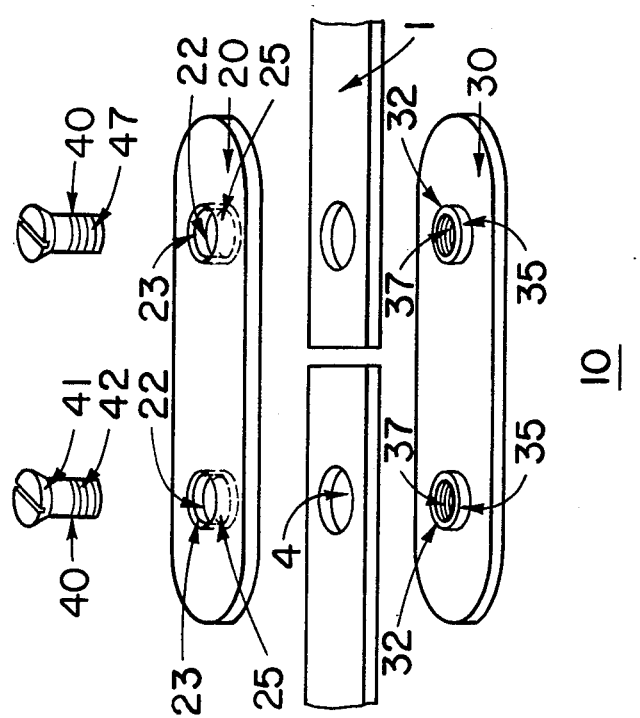
FIG. 1 is an exploded perspective view of one embodiment of the present invention.

Referring to the drawings, and, more particularly, to FIGS. 1 and 2, an embodiment to be preferred of belt fasteners 10, made according the present invention is disclosed. Fasteners 10 include a top plate 20, a bottom plate 30 and bolts 40, all of which are constructed of a non-metallic material. Ultra high molecular weight (UHMW) polyethylene is the preferred material for construction.

Top plate 20, in the embodiment shown, defines at least two bolt receiving apertures designated generally by the numeral 22. The top plate also may define on its upper surface a countersunk portion 23 surrounding each aperture for seating of the head portion of a bolt 40. Downwardly depending about each of the apertures 23 is an annular flange 25.

Bottom plate 30 also defines at least two bolt receiving apertures designated generally by the numeral 32, each being in registry with a respective overlying aperture 22 of top plate 20. The bottom plate also is provided with bolt engaging means which preferably are in the form of threads 37 molded or machined into the exterior surface of apertures 32 for engaging the threads of each bolt 40. Obviously, nuts, not shown, may be countersunk into the bottom surface of plate 30 to perform the same function. The bottom plate also includes an upwardly extending annular flange 35 about each aperture 32. Each flange 35 is adapted for insertion into a respective flange 25 of the top plate 20 to strengthen the connection by providing direct contact between plates, to provide lateral support for the bolts, and to prevent unloosening and excessive wear on the bolts by preventing contact between the bolts and the belt. The term "annular" as used herein and in the claims is to be construed broadly in that it is obvious the particular shape of engaging surfaces of the flanges is of minor importance so long as they are snug in their inserted relationship. It is also obvious that the plates may be formed with the flanges in reverse order, ie., the top plate may include the flange which is insertable into the flange of the bottom plate to perform the same function. Each of the bolts 40 are provided with a truncated cone-shaped head portion 41 adapted for seating in the countersunk portion 23 of the top plate so that the top surface of each bolt rests even with or below the flat upper surface of the top plate when the bolt is in a fastened position. Shaft 42 of each bolt includes a threaded portion 47 operable to engage threads 37 of lower plate 30 to clamp the plates and therefore the end portions of belt 1 together. For this purpose, belt 1 is provided with belt openings 4 in registry with apertures 22 and 32 of top plate 20 and bottom plate 30, respectively.

Figure 5:
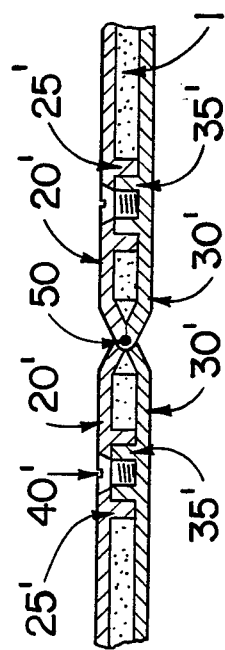
FIG. 5 is a sectional side elevation of the fastener shown in FIG. 4, shown connecting ends of a conveyor belt.
Figure 4:
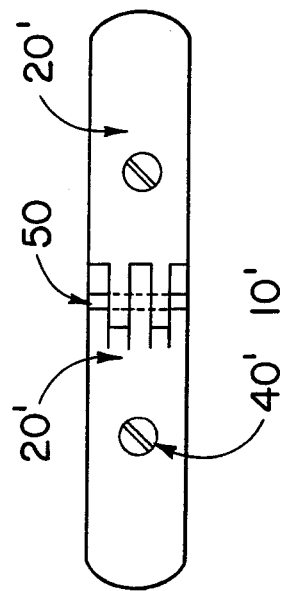
FIG. 4 is a plan view of a second embodiment of the present invention.

Referring now to FIGS. 4 and 5, a second embodiment 10' of the belt fastener of the present invention is disclosed. Fastener 10' includes a pair of top plates 20', a pair of bottom plates 30' and bolts 40', all of which are constructed of a non-metallic material as in the first embodiment. Top plates 20 are laterally spaced and hingably connected, as are bottom plates 30'. Preferably, each top plate and each respective underlying bottom plate are of integral construction, the bottom plate being bent under the top plate. Adjacent the bend of each top plate-bottom plate unit, the unit is mortised for connection to the other unit by a non-metallic hinge pin 50 so that each integral top plate-bottom plate unit hingably engages a second laterally spaced unit. The bolt receiving apertures, the countersunk portions of the top plates, the annular flanges of each plate, and the bolts are identical to corresponding structures described in detail in the description of the first embodiment and therefore such description will not be repeated. The second embodiment may be used where greater flexibility of fasteners is required.

The ends of belts of any width may be fastened together by using a suitable number of fasteners 10 or 10' as shown in FIG. 3. Also, ends of belts of any desired thickness may be fastened by use of fasteners having suitable lengths of annular flanges 25 and 35. While the fasteners may be constructed of a number of non-magnetic substances and high density plastics, in particular, UHMW polyethylene is highly preferred because of its high wear, low abrasion characteristics as well as its flexibility, chemical inertness, and non-toxic qualities.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the mean range of equivalency of the claims are therefore to be embraced therein.

We claim:

1. A belt fastener adapted to fasten two ends of a flexible belt together comprising:
    a flexible non-metallic top plate having at least two spaced bolt receiving apertures, each of said apertures surrounded by a counter sunk portion of said plate and said top plate including a downwardly depending annular flange about each aperture;
    a flexible non-metallic bottom plate having at least two spaced bolt receiving apertures, each aperture in registry with a respective aperture of said top plate; said bottom plate including an upwardly extending annular flange about each bolt receiving aperture, each flange of said bottom plate adapted for insertion into a respective flange of said top plate; and said bottom plate provided with bolt engaging means operable to secure bolts extending through respective apertures of said top and bottom plates to said bottom plate; and
    at least two non-metallic bolts, each bolt having a truncated cone-shaped head portion adapted for seating in respective counter sunk portions of said top plate and each of said bolts adapted to extend through respective bolt receiving apertures of said top and bottom plates and through belt openings in registry therewith to engage said bolt engaging means of said bottom plate for securing said plates to the belt.

2. The belt fastener as described in claim 1 wherein each of said plates and each of said bolts are manufactured of ultra-high molecular weight polyethylene.

3. The belt fastener as described in claim 1 wherein each bolt includes a threaded shaft and wherein said bolt engaging means of said bottom plate includes a threaded aperture operable to engage the threaded shaft of each bolt.

4. A belt fastener adapted to fasten two ends of a flexible belt together comprising:
    a flexible non-metallic top plate having at least two spaced bolt receiving apertures, said top plate including a downwardly depending annular flange about each bolt receiving aperture;
    a flexible non-metallic bottom plate having at least two spaced bolt receiving apertures in registry with respective bolt receiving apertures of said top plate, said bottom plate including an upwardly extending annular flange about each bolt receiving aperture, each flange of said bottom plate adapted for insertion into a respective flange of said top plate and;
    at least two non-metallic bolts, each bolt operable to securely engage said top plate and said bottom plate and to extend through respective bolt receiving apertures of said top and bottom plates and through belt openings in registry with said apertures for attachment of the fastener to the belt.

5. A belt fastener adapted to fasten two ends of a flexible belt together comprising:
    a pair of laterally spaced flexible non-metallic hingably connected top plates, each plate provided with at least one bolt receiving aperture, and each top plate including a downwardly depending annular flange about each bolt receiving aperture;
    a pair of laterally spaced flexible non-metallic hingably connected bottom plates, each plate provided with at least one bolt receiving aperture, each aperture of each of said bottom plates in registry with the respective bolt receiving aperture of each of said top plate, and each bottom plate including an upwardly extending annular flange about each bolt receiving aperture, each flange of each of said bottom plates adapted for insertion into a respective flange of each of said top plates for lateral support of bolts extending therethrough and;
    two or more non-metallic bolts, each bolt receivable within registered apertures of top and bottom plates and within openings of a belt section placed therebetween and each of said bolts adapted to engage a top plate and a bottom plate for attachment to the belt.

* * * * *